United States Patent
Johnson et al.

(10) Patent No.: US 8,282,974 B2
(45) Date of Patent: Oct. 9, 2012

(54) TANDEM USE OF CATHOLYTE AND ANOLYTE TO CLEAN AND SANITIZE FRUIT AND VEGETABLES

(75) Inventors: Thomas W. Johnson, Prior Lake, MN (US); Bob J. Dull, Akron, OH (US)

(73) Assignee: Dole Fresh Vegetables, Inc., Monterey, CA (US)

( * ) Notice: Subject to any disclaimer, the term of this patent is extended or adjusted under 35 U.S.C. 154(b) by 0 days.

(21) Appl. No.: 12/885,217

(22) Filed: Sep. 17, 2010

(65) Prior Publication Data
US 2011/0070344 A1    Mar. 24, 2011

Related U.S. Application Data

(60) Provisional application No. 61/244,004, filed on Sep. 18, 2009.

(51) Int. Cl.
*A23C 3/00* (2006.01)

(52) U.S. Cl. ............ 426/238; 426/270; 422/12; 422/13; 422/28

(58) Field of Classification Search ............ 422/12, 422/13, 28; 426/238, 270
See application file for complete search history.

(56) References Cited

U.S. PATENT DOCUMENTS

| | | | |
|---|---|---|---|
| 6,610,249 B1 * | 8/2003 | Hinze | 422/29 |
| 6,743,351 B1 | 6/2004 | Arai et al. | |
| 6,871,654 B1 * | 3/2005 | Berke et al. | 134/25.3 |
| 7,048,956 B2 | 5/2006 | Beelman et al. | |
| 2002/0040643 A1 * | 4/2002 | Ware | 99/467 |
| 2003/0170354 A1 * | 9/2003 | Beelman et al. | 426/270 |
| 2005/0244556 A1 * | 11/2005 | Karren | 426/335 |
| 2006/0102193 A1 | 5/2006 | Lyubchik et al. | |
| 2006/0260953 A1 | 11/2006 | Hopkins et al. | |
| 2007/0059410 A1 | 3/2007 | Steffen | |

FOREIGN PATENT DOCUMENTS
WO    2004/031337 A1    4/2004

OTHER PUBLICATIONS

Cleaning with electrolyzed water NPL, 2009, http://ths.gardenweb.com/forums/load/cleaning/msg0213483415070.html.*
Steffen et al., "User Experiences with Ozone, Electrolytic Water (Active Water) and UV-C Light (Ventafresh Technology) in Production Processes and for Hygiene Maintenance in a Swiss SUSHI Factory", IOA Conference and Exhibition, Valencia, Spain, Oct. 29-31, 2007, pp. 6.10-1-6.10-12.
International Search Report and Written Opinion mailed Nov. 18, 2010, for PCT/US10/49371 filed Sep. 17, 2010, 9 pages.

* cited by examiner

*Primary Examiner* — Drew Becker
*Assistant Examiner* — Preston Smith
(74) *Attorney, Agent, or Firm* — Morrison & Foerster LLP

(57) ABSTRACT

A method for de-soiling and disinfecting produce, the method including: treating the produce with a catholyte solution to yield a catholyte treated produce; sonicating the catholyte treated produce to yield a sonicated produce; and treating the sonicated produce with an anolyte solution.

12 Claims, 3 Drawing Sheets

TANDEM USE OF CATHOLYTE AND ANOLYTE TO CLEAN AND SANITIZE FRUIT AND VEGETABLES

This application claims the benefit under 35 USC 119(e) of U.S. Provisional Patent Application No. 61/244,004, filed Sep. 18, 2009, the disclosure of which is hereby incorporated by reference in its entirety.

FIELD

This application relates in general to de-soiling and disinfecting produce. More particularly, this application relates to a method for de-soiling and disinfecting produce using solutions produced by electrolysis and using sonication.

BACKGROUND

The use of chlorine to sanitize freshly harvested produce (i.e. fruits and vegetables) has been well-described. Generally, chlorine is added to water as a gas to produce hypochlorite which is the active sanitizing agent. A use level of about 100 ppm has been previously described as efficacious in reducing microbial counts and being effective against pathogens. Use levels can fluctuate as a function of soil and dirt load as well as microbial contamination levels. However, the use of chlorine presents several issues to both the production operation as well as the consumer. One shortfall of chlorine is that it is a toxic gas, which is monitored by Homeland Security, thereby complicating its handling and use. Because chlorine is toxic, accidental release can be dangerous to humans and animals. Chlorine can react with organic compounds to produce low levels of chloroform, a known carcinogen and EPA-monitored effluent contaminant. While it can be an effective sanitizing agent, chlorine is not as effective as a de-soiling agent.

It would be advantageous to identify a method for de-soiling and disinfecting produce that avoids or mitigates the toxic concerns of chlorine gas that provides significant de-soiling properties, possesses sanitation capabilities equal to or greater than chlorination, produces safe products, and can be disposed of without concern for contamination. One such method involves using the products of water electrolysis.

The electrochemistry of water was described centuries ago in the work of Sir Humphrey Davey, and in the 1837 publication of Michael Faraday entitled "The Laws of Electrolysis." Recent advances in metal and ceramic sciences has enabled the electrolysis of water to be selectively controlled, and can result in the production of two end-products, each with their own unique properties. The cathode produces a solution known as catholyte, which possesses unique de-soiling properties. The anode produces a product known as anolyte, which has been shown to have strong sanitizing qualities.

US Patent Application Publication No. 2005-0244556 A1 describes a method of de-soiling meat and hide products by saponifying the meat or hide with electrolyzed alkaline water, and disinfecting the meat or hide by treating with electrolyzed acidic water. However, one disadvantage of this method is that the electrolyzed acidic solutions have low pH's, which could damage the soft surfaces of fruits and vegetables. Furthermore, the electrolytic cell used produces turbulent flow through plate-type exchangers, which does not result in optimal salt conversion rates.

Therefore there is a need to develop a method of de-soiling and disinfecting soft surfaces, such as those of fruits and vegetables, that optimizes water electrolysis and utilizes an anolyte solution with a neutral pH. Furthermore, it would be advantageous to combine the unique de-soiling properties of the catholyte with sonication to enhance the de-soiling of produce prior to disinfecting. The value of such a non-toxic method could have a significant impact on reducing not only bacterial load but also reducing the pathogenic loads that have been most recently described as resulting in food-borne illness.

BRIEF SUMMARY

The methods disclosed herein address the disadvantages of the methodologies mentioned above. Herein, methods for treating produce with catholyte solutions and sonication, including but not limited to ultrasonication, to de-soil, optionally in tandem with an anolyte solution treatment to disinfect are described.

The methods disclosed herein show that the solution produced by the cathode in water electrolysis can be successfully used to de-soil produce. In addition, treating with the catholyte solution can be combined with sonication to increase the amount of de-soiling, and is compatible with an anolyte solution treatment to disinfect the produce before packaging.

Accordingly, one aspect of the present disclosure includes a method for de-soiling and disinfecting produce, by treating the produce with a catholyte solution to yield a catholyte treated produce; sonicating the catholyte treated produce to yield a sonicated produce; and treating the sonicated produce with an anolyte solution.

In certain embodiments, the methods disclosed herein further include electrolyzing an ionic solution to generate the catholyte solution and anolyte solution. In other embodiments, the catholyte solution and anolyte solution are generated by an electrolytic cell that produces laminar flow. In yet other embodiments, the ionic solution is a brine solution or a bicarbonate solution. In still other embodiments, the electrolytic cell comprises ceramic dielectric membranes. In further embodiments, the electrolyzing occurs less than 12 hours prior to treating the produce with the catholyte solution and anolyte solution. Preferably, the electrolyzing occurs less than 6 hours prior to treating the produce with the catholyte solution and anolyte solution.

In other embodiments, treating with the catholyte solution includes immersing the produce in a wash tank containing the catholyte solution. In yet other embodiments, the methods disclosed herein further include spraying the produce with the catholyte solution prior to immersing the produce in the wash tank. In still other embodiments, the methods disclosed herein further include diluting the catholyte solution to a 10% dilution. In further embodiments, the catholyte solution has a pH that ranges from approximately 12.3 to approximately 13.0. Preferably, the catholyte solution has an approximate pH of 13. In still further embodiments treating with the catholyte solution occurs for a period of time sufficient to yield at least a 19% increase in de-soiling as compared to treating with a liquid detergent solution having the same surface tension as the catholyte solution. Preferably, treating with the catholyte solution occurs for at least 15 seconds.

In other embodiments, the sonicating occurs in a wash tank. Preferably, the sonicating occurs in a wash tank containing the catholyte solution. In yet other embodiments, the sonicating occurs at an ultrasonication frequency that ranges from approximately 20 kHz to approximately 60 kHz. In still other embodiments, the sonicating occurs at an ultrasonication frequency of approximately 58 kHz. In further embodiments, the sonicating occurs at an ultrasonication frequency of approximately 22.3 kHz. Preferably, the sonicating occurs at multiple frequencies. In other embodiments, the sonicating occurs for a period of time sufficient to yield at least a 1.5-fold increase in de-soiling as compared to treating with the catholyte solution without sonicating. Preferably, the sonicating occurs for at least 20 seconds.

In yet other embodiments, treating with the anolyte solution includes immersing the produce in a wash tank containing the anolyte solution or spraying the produce with the anolyte solution. In certain embodiments, the methods disclosed herein further include diluting the anolyte solution to a concentration of approximately 80 ppm FAC. In other embodiments, the anolyte solution has a pH that ranges from approximately 6.2 to approximately 7.4. Preferably, the anolyte solution has an approximate pH of 7. In yet other embodiments, treating with the anolyte solution occurs for a period of time sufficient to yield at least a 1 log unit reduction in microbial load as compared to produce not treated with the anolyte solution. Preferably, treating with the anolyte solution occurs for at least 20 seconds.

In other embodiments, the produce is selected from lettuce, a leafy vegetable, a ground plant, a tree fruit, a berry, a nut, and any combination thereof.

Another aspect of the present disclosure includes a method for de-soiling and disinfecting produce, by immersing the produce in a wash tank containing a catholyte solution to yield an immersed produce; sonicating the immersed produce to yield a sonicated produce; and treating the sonicated produce with an anolyte solution.

A further aspect of the present disclosure includes a method or de-soiling and disinfecting produce, by electrolyzing a brine solution using an electrolytic cell that produces laminar flow to generate a catholyte solution and an anolyte solution, where the catholyte solution has an approximate pH of 13 and the anolyte solution has an approximate pH of 7; diluting the catholyte solution and anolyte solution to produce a 10% catholyte dilution and an anolyte with a concentration of 80 ppm Free Available Chlorine (FAC); immersing the produce in a wash tank containing the catholyte solution for 15 seconds to yield an immersed produce; sonicating the immersed produce for 20 seconds to produce a sonicated produce, where the sonicating occurs at an ultrasonication frequency of 58 kHz; removing the sonicated produce from the wash tank containing the catholyte solution; and immersing the sonicated produce in a wash tank containing the anolyte solution for 20 seconds.

BRIEF DESCRIPTION OF THE DRAWINGS

FIG. 2A depicts TPC counts at day 0. FIG. 2B depicts TPC counts at day 1.

DETAILED DESCRIPTION

Definitions

Figure 1:
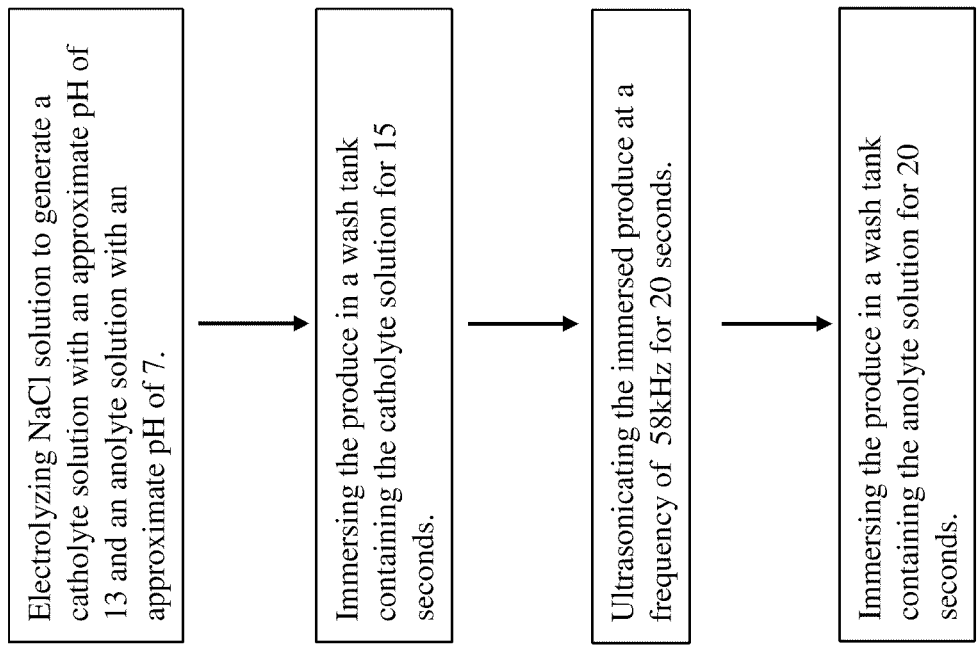
FIG. 1 is a flow chart of one embodiment of a method for de-soiling and disinfecting produce.

As used herein, "produce" refers to fruit and vegetables, including but not limited to fresh fruit.

As used herein, "de-soiling" refers to the removal of organic and inorganic materials from produce surfaces.

As used herein, "ionic solution" refers to aqueous based solutions of dissolved ions, such as sodium chloride or sodium bicarbonate ions, which are activated and separated by the electro-chemical reaction of the electrolysis process. Ionic solutions are referred to as electro-chemically activated ("ECA") solutions.

As used herein, "catholyte" refers to the electrolyte generated by the cathode of an electrolytic cell.

As used herein, "anolyte" refers to the electrolyte generated by the anode of an electrolytic cell.

As used herein, "laminar flow" refers to smooth fluid flow or fluid flowing in parallel layers, with substantially no disruption between the layers. Laminar flow is characterized by high momentum diffusion, low momentum convection, and by a pressure and velocity substantially independent from time. Laminar flow is the opposite of turbulent or rough flow.

A percent dilution of a solution (e.g., a "10% dilution") refers to a solution where X parts of the solution are diluted in 100-X parts of a solvent. In a non-limiting example, a 10% catholyte solution would be composed of 10 parts catholyte diluted in 90 (i.e., 100-10) parts water.

Tandem Catholyte, Sonication, and Anolyte Treatment for De-Soiling and Disinfecting Produce The following description sets forth exemplary configurations, parameters, and the like. It should be recognized, however, that such description is not intended as a limitation on the scope of the present invention, but is instead provided as a description of exemplary embodiments.

Overview

The following embodiments describe methods for de-soiling and disinfecting produce by treating the produce with a catholyte solution, followed by sonicating the produce, and then treating the produce with an anolyte solution. While treatment with catholyte solution, sonication, and treatment with anolyte solution are preferably performed in tandem, it should be understood that the treatment steps may be performed separately. Furthermore, in certain embodiments anolyte solution treatment may be combined with sonication. Alternatively, catholyte solution treatment may be combined with sonication.

Surprisingly, combining catholyte treatment with sonicating results in an almost two-fold improvement in de-soiling, as compared to only treating with catholyte.

One advantage of the disclosed methods is that combined de-soiling treatment of catholyte solution treatment with kinetic energy, such as sonication or ultrasonication, improves removal of foreign organic compounds compared to conventional de-soiling treatments. Another advantage of the disclosed methods is the elimination and removal of toxic chemicals and the improvement of produce quality and food safety compared to conventional methods of de-soiling and disinfecting. A further advantage of the disclosed methods is that heating of the solutions is not required. Rather, the solutions can be produced with ambient water, and all steps can occur at temperatures no higher than room temperature. Still another advantage of the disclosed method is that freshly harvested fruits and vegetables, such as leafy vegetables, may be treated prior to packaging and shipment.

One non-limiting embodiment of the disclosed methods is outlined in FIG. 1. In a first step a brine (i.e., NaCl) solution is electrolyzed using an electrolytic cell that produces laminar flow to generate a catholyte solution having an approximate pH of 13 and an anolyte solution having an approximate pH of 7. The electrolysis is performed less than six hours prior to treating produce. Following the electrolysis step, the catholyte solution is diluted to a 10% dilution and the anolyte solution is diluted to a concentration of 80 ppm FAC. The produce is then immersed in a wash tank containing the diluted catholyte solution for 15 seconds to yield an immersed produce. Then, the immersed produce is ultrasonicated at a frequency of 58 kHz for 20 seconds. The ultrasonicated produce is then removed from the wash tank containing the catholyte solution, followed by immersion in a wash tank containing the anolyte solution for 20 seconds.

Catholyte and Anolyte Production

The process of electrolysis begins with an aqueous ionic solution that has a given conductivity due to the salts dissolved in the water. When the ionic solution is contacted with an electric current passing between two electrodes, one with negative polarity and the other with positive polarity, the solution becomes activated. When the water volume is separated by a dielectric barrier, or membrane that prevents molecular passage, but accommodates ionic transfer or passage, the activated ionic solution is split into two streams: a catholyte stream and an anolyte stream. Both the catholyte and the anolyte streams have significant electro-chemical energy, one with negatively charged ions, and the other with positively charged ions and free radicals. The electro-chemical energy of the catholyte and anolyte relaxes with the passage of time, and without some further treatment, there is a total relaxation of molecules after a period of months, wherein the solutions revert to their original ingredients and state (i.e. water and dissolved ions). Thus, it is important that the catholyte and anolyte solutions be used within a specific time after generation, as their effectiveness is short lived. Preferably, the catholyte and anolyte are produced shortly before their use.

Another relevant aspect of the electrolysis process is the type of electrolytic cell used. For example, using an electrolytic cell that produces laminar flow in the divided water volume generates different chemistries compared to an electrolytic cell that produces turbulent flow. Laminar flow cells enable uniform contact of the anode and cathode surfaces to individual molecules within the ionic solution column, whereas turbulent flow cell energy exchange surfaces have reduced uniformity of contact with each micro volume or cluster of solution. Laminar flow cells also keep the two electrolyte streams separate through the process, whereas turbulent flow cells mix the streams internally yielding a single stream of solution with a pH that is roughly controlled between 7.8 and 8.8. Furthermore, laminar flow cells enable optimal salt conversion rates. This is indicative of the optimization of energy exchange, given the solutions, conductivity, and flow rate. The net result is that there are no residues when the solutions evaporate, which is a significant advantage for many specific food and remediation applications. Using a laminar flow cell produces distinct catholyte and anolyte stoichiometries that can provide better de-soiling and disinfecting properties.

Therefore, the methods disclosed herein may include electrolysis of an ionic solution to generate the catholyte solution and anolyte solution. Preferably the catholyte solution and anolyte solution are generated by an electrolytic cell that produces laminar flow. In preferred embodiments, the electrolytic cell may comprise ceramic dielectric membranes. In a particularly preferred embodiment, the electrolytic cell is an IET, Inc. ECAFLOW C101 electrolytic cell.

In certain embodiments, the electrolysis occurs prior to treating the produce with the catholyte solution and the anolyte solution. In preferred embodiments, the electrolysis occurs less than 72 hours, 60 hours, 48 hours, 36 hours, 24 hours, 20 hours, 15 hours, 12 hours, 10 hours, 8 hours, 6 hours, 5 hours, 4 hours, 3 hours, 2 hours, or 1 hour prior to treating the produce with the catholyte solution and anolyte solution. In a particularly preferred embodiment, the electrolysis occurs less than 6 hours prior to treating the produce with the catholyte solution and anolyte solution.

Any aqueous ionic solution known in the art may be used for electrolysis. Preferably, the electrolysis utilizes a brine or bicarbonate solution to produce two sets of compounds: catholytes and anolytes. The compounds formed at the positive pole of the electrolytic cell are known as catholytes. Catholytes are not caustic, but do possess a high pH. The catholyte solutions do not possess hydroxide ions but rather lack hydrogen ions, which accounts for the high pH, since $-\log[H^+]=pH$. In addition, the catholyte solutions possess the ability to reduce surface tension to a level similar to that produced by diluted, non-ionic chemical surfactants, which are unusable with the methods disclosed herein. The compounds formed at the negative pole of the electrolytic cell are known as anolytes. Typically, the anolytes produced by the methods described herein are complex mixtures containing a high level of free chlorine, mostly existing as hypochlorous acid. However, the anolytes also contain many other reactive species of oxygen in the form of free radicals, which are well known to have significant anti-microbial characteristics.

Catholyte

Preferably the catholyte solution is dosed into a wash tank, or "flume," that may be used for treating the produce. Alternatively, a portion of the catholyte solution may be stored in a spraying container. In certain embodiments, treating the produce with the catholyte solution includes immersing the produce in a wash tank containing the catholyte solution. The methods disclosed herein may further include spraying the produce with the catholyte solution prior to immersing the produce in the wash tank containing the catholyte solution.

The catholyte solution may be used in an undiluted state, or it may be used as a dilution. In certain embodiments, the catholyte solution is used as a 95%, 90%, 85%, 80%, 75%, 65%, 55%, 50%, 40%, 30%, 25%, 20%, 19%, 18%, 17%, 16%, 15%, 14%, 13%, 12%, 11%, 10%, 9%, 8%, 7%, 6%, 5%, 4%, 3%, 2%, 1%, or less than a 1% dilution. In the data presented herein, a 10% dilution of the catholyte solution results in the best produce de-soiling with the least amount of damage to the produce structure and surface lipids. Thus in a particularly preferred embodiment, the catholyte solution is used as a 10% dilution.

The catholyte solution generated by the electrolytic cell preferably has a high pH. For example, the catholyte solution may have a pH that is approximately 8.0, 8.1, 8.2, 8.3, 8.4, 8.5, 8.6, 8.7, 8.8, 8.9, 9.0.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, or 14.0. In a certain embodiment, the catholyte solution has a pH that ranges from approximately 9.5 to approximately 13.5. In a preferred embodiment, the catholyte solution has a pH that ranges from approximately 12.3 to approximately 13.0. In a particularly preferred embodiment, the catholyte solution has an approximate pH of 13.0. As used herein "approximate pH" and "pH that ranges from approximately" refer to a pH that varies by +/−0.2 (i.e. pH 12.8 to 13.2).

In certain aspects of the disclosed methods, treating with the catholyte solution occurs for at least 5 minutes, at least 4 minutes, at least 3 minutes, at least 2 minutes, or at least 1 minute. Preferably treating with the catholyte solution occurs for at least 60 seconds, at least 50 seconds, at least 45 seconds, at least 40 seconds, at least 35 seconds, at least 30 seconds, at least 25 seconds, at least 20 seconds, at least 15 seconds, or at least 10 seconds. Preferably the methods disclosed herein are adapted to current processing plants that use piping with open and closed loop flumes that expose produce to solutions for 15 seconds. Thus, in a particularly preferred embodiment, treating with the catholyte solution occurs for at least 15 seconds.

Treating with the catholyte solution de-soils the produce. In one embodiment, treating with the catholyte solution de-soils the produce more effectively than detergents such as liquid dishwashing detergents. The de-soiling can be quantified, for example, by determining the neophalic turbidity unit (NTU) using a photo-electric device to determine the clarity of a water column. The lower the turbidity, the less interference there is to light passing through the water column. In preferred embodiments, treating with the catholyte solution occurs for a period of time sufficient to yield at least a 95%, 85%, 75%, 65%, 50%, 45%, 40%, 35%, 30%, 25%, 24%, 23%, 22%, 21%, 20%, 19%, 18%, 17%, 16%, 15%, 14%, 13%, 12%, 11%, 10%, 9%, 8%, 7%, 6%, or 5% increase in de-soiling compared to treating with a detergent, under similar treatment conditions. In a particularly preferred embodiment, treating with the catholyte solution occurs for a period of time sufficient to yield at least a 19% increase in de-soiling compared to treating with a detergent.

Ultrasonication

One aspect of the disclosed method involves ultrasonicating the solution into which produce is immersed to enhance de-soiling, as compared to catholyte immersion alone. The kinetics of ultrasonication, which are attributable to adiabatic affects, may be an important aspect in optimizing the surfactant potential of the catholyte dilutions. By selecting a specific ultrasonication frequency at a given intensity within the "ultra" range and time, an additional, incremental antimicrobial affect may be obtained before the produce is treated with the disinfecting solution. In a preferred embodiment, the ultrasonication is performed using a Crest Instruments Ceramic Ultrasonic Generator, from Crest Instruments, rated at 500 watts and operating at a frequency of 58 kHz. While ultrasonication is preferred, it is envisioned that other forms of kinetic energy may also enhance the de-soiling and disinfecting effects of the catholyte and anolyte solutions.

While ultrasonication may occur in a separate container, it is preferable for the ultrasonication to occur in the wash tank containing the immersing catholyte solution.

The ultrasonication may occur at a frequency of approximately 15 kHz, 16 kHz, 17 kHz, 18 kHz, 19 kHz, 20 kHz, 20.3 kHz, 20.5 kHz, 20.7 kHz, 20.9 kHz, 21 kHz, 21.3 kHz, 21.5 kHz, 21.7 kHz, 21.9 kHz, 22 kHz, 22.1 kHz, 22.2 kHz, 22.3 kHz, 22.4 kHz, 22.5 kHz, 22.6 kHz, 22.7 kHz, 22.8 kHz, 22.9 kHz, 23 kHz, 23.3 kHz, 23.5 kHz, 23.7 kHz, 23.9 kHz, 24 kHz, 24.5 kHz, 25 kHz, 26 kHz, 27 kHz, 28 kHz, 29 kHz, 30 kHz, 31 kHz, 32 kHz, 33 kHz, 34 kHz, 35 kHz, 36 kHz, 37 kHz, 38 kHz, 39 kHz, 40 kHz, 41 kHz, 42 kHz, 43 kHz, 44 kHz, 45 kHz, 46 kHz, 47 kHz, 48 kHz, 49 kHz, 50 kHz, 51 kHz, 52 kHz, 53 kHz, 54 kHz, 55 kHz, 55.3 kHz, 55.7 kHz, 55.9 kHz, 56 kHz, 56.3 kHz, 56.5 kHz, 56.7 kHz, 56.9 kHz, 57 kHz, 57.1 kHz, 57.2 kHz, 57.3 kHz, 57.4 kHz, 57.5 kHz, 57.6 kHz, 57.7 kHz, 57.8 kHz, 57.9 kHz, 58 kHz, 58.1 kHz, 58.2 kHz, 58.3 kHz, 58.4 kHz, 58.5 kHz, 58.6 kHz, 58.7 kHz, 58.8 kHz, 58.9 kHz, 59 kHz, 59.3 kHz, 59.5 kHz, 59.7 kHz, 59.9 kHz, 60 kHz, 61 kHz, 62 kHz, 63 kHz, 64 kHz, 65 kHz, 66 kHz, 67 kHz, 68 kHz, 69 kHz, or 70 kHz. In certain embodiments, the ultrasonication occurs at a frequency that ranges from approximately 20 kHz to approximately 60 kHz. Preferably the ultrasonication occurs at a frequency of approximately 58 kHz, or approximately 22.3 kHz. Alternatively multiple ultrasonication frequencies may be used instead of a single ultrasonication frequency. As used herein "a frequency of approximately" refers to a frequency that varies by +/−0.2 kHz (i.e. 22.1 kHz to 22.5 kHz).

In preferred embodiments, the ultrasonication occurs for at least 5 minutes, at least 4 minutes, at least 3 minutes, at least 2 minutes, or at least 1 minute. Preferably the ultrasonication occurs for at least 60 seconds, at least 50 seconds, at least 45 seconds, at least 40 seconds, at least 35 seconds, at least 30 seconds, at least 25 seconds, at least 20 seconds, at least 15 seconds, or at least 10 seconds. Preferably the methods disclosed herein are adapted to current processing plants that use piping with open and closed loop flumes. In current processing plants, the lag time between inlet and discharge in a flume wash section is typically 20 seconds. Thus, in a particularly preferred embodiment, the ultrasonication occurs for at least 20 seconds.

Ultrasonicating the produce enhances the amount of de-soiling that occurs when the produce is treated with the catholyte solution. Preferably ultrasonication occurs for a period of time sufficient to yield at least a 10-fold, 9-fold, 8-fold, 7-fold, 6-fold, 5-fold, 4.5-fold, 4-fold, 3.5-fold, 3-fold, 2.5-fold, 2-fold, 1.5-fold, or 1-fold increase in de-soiling as compared to treating with the catholyte solution without ultrasonication. In a particularly preferred embodiment, ultrasonication occurs for a period of time sufficient to yield at least a 1.5-fold increase in de-soiling as compared to treating with the catholyte solution without ultrasonication.

Anolyte

Preferably the anolyte solution is generated in its own wash tank that may be used for treating the produce. Alternatively the anolyte solution may be stored in a spraying container. In certain embodiments, treating the produce with the anolyte solution comprises immersing the produce in a wash tank containing the anolyte solution or spraying the produce with the anolyte solution.

The anolyte solution used in certain embodiments, of the disclosed method can contain a high level of free available chlorine (FAC), mostly existing as hypochlorous acid. As used herein, the concentration of anolyte solution is given as parts-per-million (ppm) FAC. In certain embodiments, the anolyte solution is used at a concentration of at least 150 ppm, 140 ppm, 130 ppm, 120 ppm, 110 ppm, 100 ppm, 90 ppm, 89 ppm, 88 ppm, 87 ppm, 86 ppm, 85 ppm, 84 ppm, 83 ppm, 82 ppm, 81 ppm, 80 ppm, 79 ppm, 78 ppm, 77 ppm, 76 ppm, 75 ppm, 70 ppm, 65 ppm, 60 ppm, 55 ppm, 50 ppm, 45 ppm, 40 ppm, 35 ppm, 30 ppm, 25 ppm, 20 ppm, 15 ppm, or 10 ppm FAC. In a particularly preferred embodiment, the anolyte solution is used at a concentration of 80 ppm FAC.

In one aspect of the disclosed method, the anolyte solution produced has a neutral pH. For example, the anolyte solution may have a pH that is approximately 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0. In certain embodiments, the anolyte solution has a pH that ranges from approximately 6 to 7.5. Preferably, the anolyte solution has a pH that ranges from approximately 6.2 to 7.4. In a preferred embodiment, the anolyte solution has an approximate pH of 7. As used herein "approximate pH" refers to a pH that varies by +/−0.2 (i.e. pH 6.8 to 7.2).

Treating with the anolyte solution disinfects the produce. Preferably the produce is treated with the anolyte solution for a time sufficient to disinfect the produce without damaging the quality of the produce.

In certain aspects of the disclosed methods, treating with the anolyte solution occurs for at least 5 minutes, at least 4 minutes, at least 3 minutes, at least 2 minutes, or at least 1 minute. Preferably treating with the anolyte solution occurs for at least 60 seconds, at least 50 seconds, at least 45 seconds, at least 40 seconds, at least 35 seconds, at least 30 seconds, at least 25 seconds, at least 20 seconds, at least 15 seconds, or at least 10 seconds. Preferably the methods disclosed herein are adapted to current processing plants that use piping with open and closed loop flumes. To match the current plant processes treatment produce is washed with the anolyte solution for at least 20 seconds. Thus, in a particularly preferred embodiment, treating with the anolyte solution occurs for at least 20 seconds.

Disinfecting can be assessed by measuring microbial load. In preferred embodiments, microbial load is determined by Total Aerobic Plate Counts (TPC). Microbial counts may be on the order of, for example, $10^6$, and so preferably log units are used to compare TPC counts.

In preferred embodiments, treating with the anolyte solution occurs for a period of time sufficient to yield at least a 10 log, 9 log, 8 log, 7 log, 6 log, 5 log, 4 log, 3 log, 2 log, 1 log, or half log unit reduction in microbial load as compared to produce not treated with the anolyte solution. In a particularly preferred embodiment, treating with the anolyte solution occurs for a period of time sufficient to yield at least a 1 log unit reduction in microbial load as compared to produce not treated with the anolyte solution. A reduction of at least 1 log unit using the anolyte solution is similar to the reduction attained using chlorine-injected water sanitation.

EXAMPLES

Example 1

Disinfecting Produce by Treating with Anolyte Solution

Introduction

The following experiments evaluate anolyte as a successful disinfecting solution for leafy vegetables, specifically tender lettuces. While neither pathogen monitoring nor pathogen spiking was performed, a significant reduction in total aerobic load is expected to reduce pathogen loads, as most pathogens are more sensitive to such sanitizers than their non-pathogen competitors. Food borne infections are a result of ingesting a sufficient load of the pathogen in order to induce illness. Similarly, food intoxications arise from a sufficient production of toxins from a load of toxin-producing pathogens. The reduction of these pathogenic loads will reduce the total overall risk of food borne infection.

A preliminary study indicated the value of such treatments. While initial microbial loads were reduced to almost zero, there was some indication of irritation or topical damage to the vegetables tested as measured by increased ethylene production (up to three times that of control) along with an increased respiration rate, as measured by accelerated oxygen consumption and increased carbon dioxide production within a closed system. The present study determines an optimal use rate that results in a significant microbial load reduction along with a normal ethylene response and no acceleration of respiration.

Materials and Methods

Anolyte Treatment

Anolyte solutions were prepared less than 6 hours prior to treatment using an IET, Inc. ECAFLOW C101 electrolytic cell, with an output rate of 200 L/hr. A brine solution was diluted with deionized water to an approximate ratio of 0.2% NaCl to $H_2O$, using the valve control on the electrolytic cell, and electrolyzed. The brine solution was input into the electrolytic cell at an approximate rate of 3.5 L input/min. The flow rate of the electrolysis was 20 GPH (gallons per hour) at a free available chlorine (FAC) concentration of 400 ppm, which was diluted with water to solution target concentrations. The solution target concentrations chosen were 100 ppm, 80 ppm, 60 ppm, 40 ppm, and 20 ppm FAC, each with a nominally neutral pH. Each target solution was tested to determine an exact chlorine concentration prior to use. The control for this experiment was chosen to be 0 ppm FAC, using cold water drawn from the tap. In all cases, a freshly harvested blend of tender, leafy vegetables known as "Spring Mix," collected from harvest bins prior to de-soiling or other de-soiling preparation, was mixed with the anolyte solutions using gentle immersion of the vegetables into each anolyte solution for 20 seconds.

Packaging and Measurements

Following immersion in anolyte solution, each vegetable sample underwent centrifugal spinning to remove any residual solution. Then 142 grams of each vegetable sample treatment was hand packaged in 300 OTR (oxygen transmission rate) film. The samples tested for ethylene were packaged in triplicate and an additional two samples were packaged for microbial testing.

Microbial testing was performed right after treatment and packaging and also 24 hours post packaging, each test used a separately packaged sample. Microbial load was determined by Total Aerobic Plate counts (TPC). Test and control samples were sent to an outside laboratory for microbial TPC testing.

Ethylene analysis was performed 24 hours post packaging. Plant-processed and packaged materials were also tested and used as baseline values for respiration and ethylene production Ethylene analysis was accomplished using a ⅛ inch×6 ft inch open stainless steel column packed with silica gel, and affixed with a flame ionization detector. Quantification against an ethylene standard was performed using the area integration received from each sample tested against that of the standard. The ethylene standard was 100 ppm ethylene in nitrogen.

Oxygen and carbon dioxide present within the test and control packages were measured using a Bridge Analyzer electrochemical sensor from Bridge Apparatus, which requires an insertion of a test probe through the film and into the package void space. Results for both gases were available within 30 seconds of using the test probe. These results were compared to the values received from controls.

Results and Discussion

Vegetable leaves secured from harvest bins still carried a heavy soil load and no attempt was made to remove that soil prior to anolyte treatment. As shown in Table 1, anolyte treatment resulted in a 1-2 log unit reduction in TPC after only 20 seconds in the various anolyte dilutions (Table 1). The use of proper de-soiling prior to the addition of anolyte results in a reduction down to one log unit, as was seen in a previous trial using material that had passed through a extensive washing flume system (Table 3).

TABLE 1

| | | | | TPC Counts | | | |
|---|---|---|---|---|---|---|---|
| | 0 ppm FAC | 20 ppm FAC | 40 ppm FAC | 65 ppm FAC | 83 ppm FAC | 97 ppm FAC | 107 ppm FAC |
| Day 0 | $1.6 \times 10^5$ | $5 \times 10^3$ | $1.6 \times 10^4$ | $8.5 \times 10^3$ | $2 \times 10^4$ | $4.2 \times 10^3$ | $2.6 \times 10^3$ |
| Day 1 | $8.8 \times 10^5$ | $1.7 \times 10^5$ | $5.2 \times 10^5$ | $4 \times 10^4$ | $1.1 \times 10^4$ | $2 \times 10^4$ | $4 \times 10^4$ |

The impact of anolyte treatment upon respiration rate and ethylene production revealed that even the slightest addition of anolyte appears to enhance the respiration rate and release of ethylene (Table 2). As shown in Table 2, as anolyte concentration was increased, the impact on respiration and ethylene concentration also increased. However, this affect seemed to peak at an anolyte concentration of 65 ppm FAC (5.04% $CO_2$, 14.65% $O_2$, and 7.42 ppm ethylene). Surprisingly, the respiration and ethylene release rates were reduced when anolyte concentration increased to values higher than 65 ppm FAC. These results are seen when the means of $CO_2$, $O_2$, and ethylene concentration are compared. Variability in response was observed when looking at the specific data. Even processing plant-produced products displayed variability in response due to bulk density, cut size, and cut type. To ascertain the reason for the variability seen, relative distributions of the individual lettuce types within the bag were measured. It appears that the variability in response is directly proportional to the amount of red lettuce present in the bags. Since this test material was collected prior to fluming and had only mechanical mixing and not the "infinite" mixing available when transversing the flume, it would be expected that the distributions within a 142 g bag would be quite variable. It appears that it is this variability in mixing that resulted in the broad range of values seems in the test materials treated with anolyte at concentrations above 65 ppm FAC. Better mixing of the test materials can be undertaken in order to reduce the variability.

TABLE 2

Respiration and Ethylene Production in Response to Anolyte Treatment

|  | 0 ppm$_a$ | 20 ppm | 40 ppm | 65 ppm | 83 ppm | 97 ppm$_a$ | 107 ppm$_b$ |
|---|---|---|---|---|---|---|---|
| $CO_2$ | 3.64 | 4.31 | 4.08 | 5.42 | 4.51 | 3.90 | 3.94 |
| $CO_2$ | 3.99 | 4.13 | 4.39 | 5.04 | 4.51 | 4.76 | 4.07 |
| $CO_2$ | 3.97 | 3.74 | 4.32 | 4.65 | 4.87 | 4.26 |  |
| Average $CO_2$ % | 3.86 | 4.06 | 4.26 | 5.04 | 4.63 | 4.31 | 4.01 |
| $O_2$ | 16.29 | 15.49 | 15.89 | 14.17 | 15.04 | 15.84 | 15.75 |
| $O_2$ | 15.90 | 15.76 | 15.40 | 14.69 | 15.08 | 14.74 | 15.68 |
| $O_2$ | 15.94 | 16.28 | 15.54 | 15.10 | 14.60 | 15.36 |  |
| Average $O_2$ % | 16.04 | 15.84 | 15.61 | 14.65 | 14.91 | 15.31 | 15.72 |
| Ethylene | 3.46 | 4.13 | 5.00 | 7.46 | 4.77 | 4.54 | 3.93 |
| Ethylene | 3.46 | 4.38 | 3.49 | 8.64 | 5.09 | 6.06 | 5.58 |
| Ethylene | 4.60 | 4.62 | 7.62 | 6.16 | 6.05 | 4.69 |  |
| Average Ethylene ppm | 3.84 | 4.38 | 5.37 | 7.42 | 5.30 | 5.10 | 4.76 |

Notes:
$_a$ = low chloride (0.6 g/liter)
$_b$ = high chloride (6 g/liter)

Even with the variability, it is clear that anolyte at a concentration that affects proper sanitation at the lowest level possible while minimizing the effects of the chlorine upon respiration and ethylene reduction would be desired. The results shown in Table 2, suggest that a preferable anolyte concentration would be less than 40 ppm FAC.

Results from additional trials are shown in Tables 3 and 4 below.

TABLE 3

Control (packaged in plant)

| Day | $O_2$ (%) | $CO_2$ (%) | Ethylene (ppm) | Odor | Acceptability[†] | TPC | Notes |
|---|---|---|---|---|---|---|---|
| 0* | 20.6 | 0.07 | N.D. | 0 | 0 | $4.0 \times 10^3$ |  |
| 1 | 15.86 | 4.69 | 4.1 | 0 | 0 | $1.18 \times 10^4$ |  |
| 2 | 13.7 | 7.62 | 3.9 | NT | NT | NT |  |
| 3 | 12.2 | 7.8 | 7 | NT | NT | NT |  |
| 4 | 11.4 | 7.9 | 12.2 | 0 | 0 | $1.7 \times 10^5$ | a |
| 5 | 10.47 | 9.05 | 7.2 | 0 | 0 | NT |  |
| 6 | 7.88 | 9.51 | 7.2 | 0 | 0 | $6.0 \times 10^6$ |  |
| 7 | 7.75 | 9.22 | 6.7 | 0 | 0 | NT |  |
| 8 | 7.76 | 9.46 | 4.6 | 0 | 0 | $4.3 \times 10^5$ |  |
| 9 | 5.91 | 10 | 4.8 | NT | NT | NT |  |
| 10 | 5.47 | 9.21 | 7.1 | NT | NT | NT |  |
| 11 | 6.84 | 8.99 | 4.8 | 0 | 0 | 0 |  |
| 12 | 4.34 | 10.3 | 3 | 0.5 | 0 | NT |  |
| 13 | 4.63 | 9.75 | 4.1 | 0.5 | 0.5 | 0 |  |

Notes:
*= Day 0 corresponds to Aug. 14, 2008
[†]= Acceptability is scored on a scale from 0 to 2, where 0 is the best score and corresponds to a most acceptable product and 2 corresponds to an unacceptable product.
a = bags moved around, possible heat damage

TABLE 4

| | | | Anolyte Solution (107 ppm FAC) | | | | |
|---|---|---|---|---|---|---|---|
| Day | $O_2$ (%) | $CO_2$ (%) | Ethylene (ppm) | Odor | Acceptability[†] | TPC | Notes |
| 0 | 20.01 | 0.49 | N.D. | 2 | 0 | $4.5 \times 10^1$ | |
| 1 | 12.91 | 7.32 | 7.9 | 0 | 0 | $2.0 \times 10^3$ | |
| 2 | 10.61 | 10.28 | 11.6 | NT | NT | NT | |
| 3 | 9.71 | 10.18 | 11.3 | NT | NT | NT | |
| 4 | 3.08 | 14.5 | 13.3 | 0 | 0 | $1.3 \times 10^4$ | a |
| 5 | 5.52 | 11.7 | 9.9 | 0 | 0 | NT | |
| 6 | 3.26 | 12.2 | 10.1 | 0 | 0 | $1.5 \times 10^5$ | |
| 7 | 2.93 | 11.8 | 8.3 | 0 | 0 | NT | |
| 8 | 3.33 | 11.8 | 6.8 | 0 | 0 | $2.1 \times 10^6$ | |
| 9 | 3.69 | 11.8 | 8 | NT | NT | NT | |
| 10 | 5.07 | 8.54 | 5.2 | NT | NT | NT | |
| 11 | 0.26 | 11.5 | 8.9 | 0 | 0 | 0 | |
| 12 | 0.41 | 10.9 | 4.8 | 0.5 | 0 | NT | |
| 13 | 0.45 | 10.6 | 12 | 1 | 0.5 | 0 | |

Notes:
*= Day 0 corresponds to Aug. 14, 2008
[†]= Acceptability is scored on a scale from 0 to 2, where 0 is the best score and corresponds to a most acceptable product and 2 corresponds to an unacceptable product.
a = bags moved around, possible heat damage

Example 2

De-Soiling and Disinfecting Produce by Sequentially Treating with Catholyte and Anolyte Solutions The catholyte solution produced from the electrolysis of brine solution was used as a de-soiling agent. The following experiments test the validity of using the catholyte as a de-soiling solution for fresh vegetables. The ability to remove soil and biofilms from vegetables was assessed using turbidity measurements. A greater turbidity is an indication of the ability of the catholyte treatment to de-soil the vegetables. Undiluted catholyte solution was compared to several dilutions. A non-ionic surfactant (i.e. dishwashing detergent) was used as a positive control. Fresh water from the tap was used as the negative control. In addition, the catholyte treated samples were subjected to ultrasonication treatment to identify its effectiveness in loosening and removing additional soil and biofilm from the vegetables. Once an effective dilution was identified, the vegetables were treated with anolyte solutions having concentrations between 0 and 80 ppm FAC to test for their ability to disinfect. Samples were submitted for microbial load counts at both Day 0 and Day 1.

Materials and Methods

Fresh catholyte and anolyte solutions were produced less than 6 hours prior to treatment using an electrolytic cell (ECAFLOW C101) as described in Example 1 above. The brine solution was input into the electrolytic cell at an approximate rate of 3.5 L input/min. The electrolytic cell yielded an anolyte output rate of approximately 2.3 L/min at 350 ppm FAC, and a catholyte output rate of approximately 1.2 L/min with a pH 12.7-13.0. The freshly harvested Spring Mix blend of vegetables was used for all trials. The Spring Mix has a tendency to ball up when wet. Without proper precleaning, the Spring Mix can hide many of its surfaces when balled up. The surfactant action of catholyte tends to penetrate and eliminate the balling up of the Spring Mix.

Catholyte Treatment

Samples were immersed for 15 seconds in catholyte solutions having concentrations of 100% (undiluted), 50% dilution with tap water, and 10% dilution with tap water. The surface tension and pH were measured for each treated sample. A non-ionic surfactant (i.e. liquid dishwashing detergent) was diluted with water to a surface tension value similar to undiluted catholyte and was used as a positive control. The release of soil and biofilm into the catholyte solution was measured in the catholyte solutions after removal of the vegetable samples as a function of turbidity and corrected for the blank solutions. Turbidity was measured in neophalic turbidity units (NTU) using a Hach 2100AN Turbidometer. The turbidity meter was calibrated to ensure accuracy of the turbidity measurements. The surface tension of each sample was also measured after catholyte treatment. Surface tension was measured in milli Newtons using a Kibron Aqui Pi tensiometer. The surface tension meter was calibrated to ensure accuracy of the surface tension measurements.

Ultrasonication

After the fresh vegetable samples were incubated in the catholyte solutions for 15 seconds they were subjected to ultrasonication for 20 seconds using a Crest Instruments Ceramic Ultrasonic Generator rated at 500 watts and operating at a frequency of 58 kHz. The ultrasonication was performed while the vegetable samples were still immersed in the catholyte solution.

Anolyte Treatment

After ultrasonication, the vegetable samples were removed from the catholyte solutions, and the samples treated with either the undiluted catholyte solution or the 10% catholyte dilution were subsequently treated with anolyte solutions. For the anolyte treatment, fresh anolyte in dilutions of 80, 60, 40, and 20 ppm FAC were used. A water control (0 ppm FAC) was also used as a negative control. The vegetable samples were immersed in the anolyte solutions for 20 seconds.

Packaging and Measurements

Following treatment with anolyte, 142 grams of each vegetable sample was packaged in duplicate and sealed in 300 OTR film, as described in Example 1 above. The microbial load of each sample was measured by TPC at the time of packaging and 24 hours post packaging as described in Example 1 above. Successful treatments were identified by maximal microbial kill, with minimal excitation of ethylene and minimal respiratory enhancement above the control.

Results and Discussion

The results from the catholyte de-soiling and subsequent ultrasonication treatment are shown in Table 5 below.

TABLE 5

| Treatment | Time of Test | Surface Tension (mN) | Turbidity (NTU) |
|---|---|---|---|
| Water | Blank | 70.0 | 0.6 |
| | After water | 76.0 | 59.0 (corrected) |
| | After ultrasonication | 69.2 | 64.6 (corrected) |
| 100% Catholyte | Blank | 60.6 | 9.85 |
| | After catholyte | 28.7 | 48.7 (corrected) |
| | After ultrasonication | 61.7 | 65.8 (corrected) |
| 50% Catholyte | Blank | 64.2 | 21.4 |
| | After catholyte | 58.9 | 35.4 (corrected) |
| | After ultrasonication | 55.7 | 62.8 (corrected) |
| 10% Catholyte | Blank | 66.6 | 1.76 |
| | After catholyte | 67.2 | 36.9 (corrected) |
| | After ultrasonication | 73.1 | 73.7 (corrected) |
| Detergent | Blank | 67.2 | 6.28 |
| | After detergent | 66.1 | 30.9 (corrected) |
| | After ultrasonication | 65.9 | 49.4 (corrected) |

Turbidity and surface tension were measured before catholyte treatment, after catholyte treatment, and after the ultrasonication step for each trial. Measurement of surface tension is important as it is the key attribute which affects release of soils and biofilms from surfaces. A commercially available liquid detergent was included in the trial as a positive control and titrated to a surface tension corresponding with the surface tension values of catholyte as a means to fully understand the capabilities of catholyte. Similarly, tap water was used as a negative control as it has a much higher surface tension with little surfactant properties. Turbidity, on the other hand is a direct measurement of the amount of soil and biofilm released from the vegetables and placed in the wash waters. The higher the value, the more soil released.

As shown in Table 5, undiluted catholyte had the lowest surface tension (28.7 mN), while tap water had the highest (76.0 mN). The various catholyte dilutions fell in line with the greatest dilution having the highest surface tension (67.2 mN). This followed similarly to the turbidity measurements obtained after the 45 second washing. The undiluted catholyte had a turbidity of 48.7 NTU, while the 50% dilution had a turbidity of 35.4 NTU, and the 10% dilution had a turbidity of 36.9 NTU. This indicated that the undiluted catholyte by itself was better at removing soils and biofilms. Surprisingly, the commercial detergent performed poorly with the lowest turbidity (30.9 NTU), whereas the water control had a turbidity of 59.0 NTU that was higher than the undiluted catholyte (48.7 NTU). The results indicated that the 10% catholyte dilution yielded a 19.4% increase in de-soiling samples when compared to the commercial detergent.

Ultrasonication of the vegetable samples for 20 seconds gave very different turbidity results (Table 5). After ultrasonication, the greatest turbidity was seen with the 10% catholyte dilution (73.7 NTU), while the 50% catholyte dilution (62.8 NTU) and undiluted catholyte (65.8 NTU) performed about the same. Surprisingly, there was an almost two-fold increase in turbidity when ultrasonication was applied to the samples treated with the 10% catholyte dilution. The detergent control was lower than any of the catholyte treatments (49.5 NTU), and little improvement was seen over the water control (64.6 NTU). Without being limited by theory, it appears that the reason for the enhancement of the ability of the 10% catholyte dilution to remove soil was due to its ionic interaction, which nullified the surface-to-surface interactions of the soils with the surface of the vegetables resulting in an increased turbidity and enhanced release of soils and biofilms. While water has its share of ionic character and hydrogen binding, it is usually with itself rather than soils and biofilms.

In most cases, the surface tension of the solvent increased after catholyte washing and ultrasonication treatment. There were a couple of exceptions, most notably in undiluted catholyte (61.7 mN) and the 50% catholyte dilution (55.7 mN). Initially this was difficult to explain, but after a short time the treated vegetables became very limp and developed surface spots. This lead to the conclusion that undiluted catholyte and the 50% catholyte dilution actually destroyed the protective coating of the leaves and the added lipids and lipoidal surfactants (i.e., phospholipids) further decreased the surface tension. In the case of undiluted catholyte, sufficient lipids were removed during washing that ultrasonication treatment resulted in the freed lipids forming micelles, as has been described in various publications. These micelles would become discrete functions that would tie-up biological lipids and surfactants and eliminate any effect of these components upon surface tension. As the 50% catholyte dilution was less destructive than undiluted catholyte, micellular formation was not possible as insufficient lipids were released.

To study the tandem effects of catholyte and anolyte treatment, vegetable samples treated with undiluted catholyte and the 10% catholyte dilution were selected for anolyte treatment. After catholyte treatment, the vegetable samples were further treated with anolyte dilutions ranging from 20 to 80 ppm FAC. Fresh tap water served as the 0 ppm FAC negative control. After anolyte treatment, each sample was packaged on 300-OTR film and chilled to 34° F. Each sample was then sent out for microbial analysis (TPC counts), and a second set of samples was sent out 24 hours post-packaging. The data is shown in the Tables 6 and 7 below.

TABLE 6

| | TPC at Day 0 | | | | | | |
|---|---|---|---|---|---|---|---|
| | Anolyte Concentration (FAC) | | | | | | |
| Day 0 | 0 ppm | 20 ppm | 40 ppm | 60 ppm | 80 ppm | Plant Controls | |
| 100% Catholyte | $1.5 \times 10^4$ | $1.2 \times 10^4$ | $1.6 \times 10^3$ | $9.2 \times 10^3$ | $3.5 \times 10^3$ | $2.0 \times 10^4$ | $1.5 \times 10^4$ |
| 10% Catholyte | $3.7 \times 10^5$ | $4.0 \times 10^4$ | $1.0 \times 10^5$ | $3.0 \times 10^4$ | $8.6 \times 10^3$ | | |

TABLE 7

TPC at Day 1

| Day 1 | Anolyte Concentration (FAC) | | | | | Plant Controls | |
|---|---|---|---|---|---|---|---|
| | 0 ppm | 20 ppm | 40 ppm | 60 ppm | 80 ppm | | |
| 100% Catholyte | $1.8 \times 10^6$ | $2.9 \times 10^5$ | $2.3 \times 10^6$ | $1.6 \times 10^5$ | $1.8 \times 106$ | $1.0 \times 10^6$ | $1.0 \times 10^7$ |
| 10% Catholyte | $1.6 \times 10^7$ | N.P. | $4.0 \times 10^6$ | $1.1 \times 10^7$ | $6.0 \times 10^6$ | | |

Figure 2:
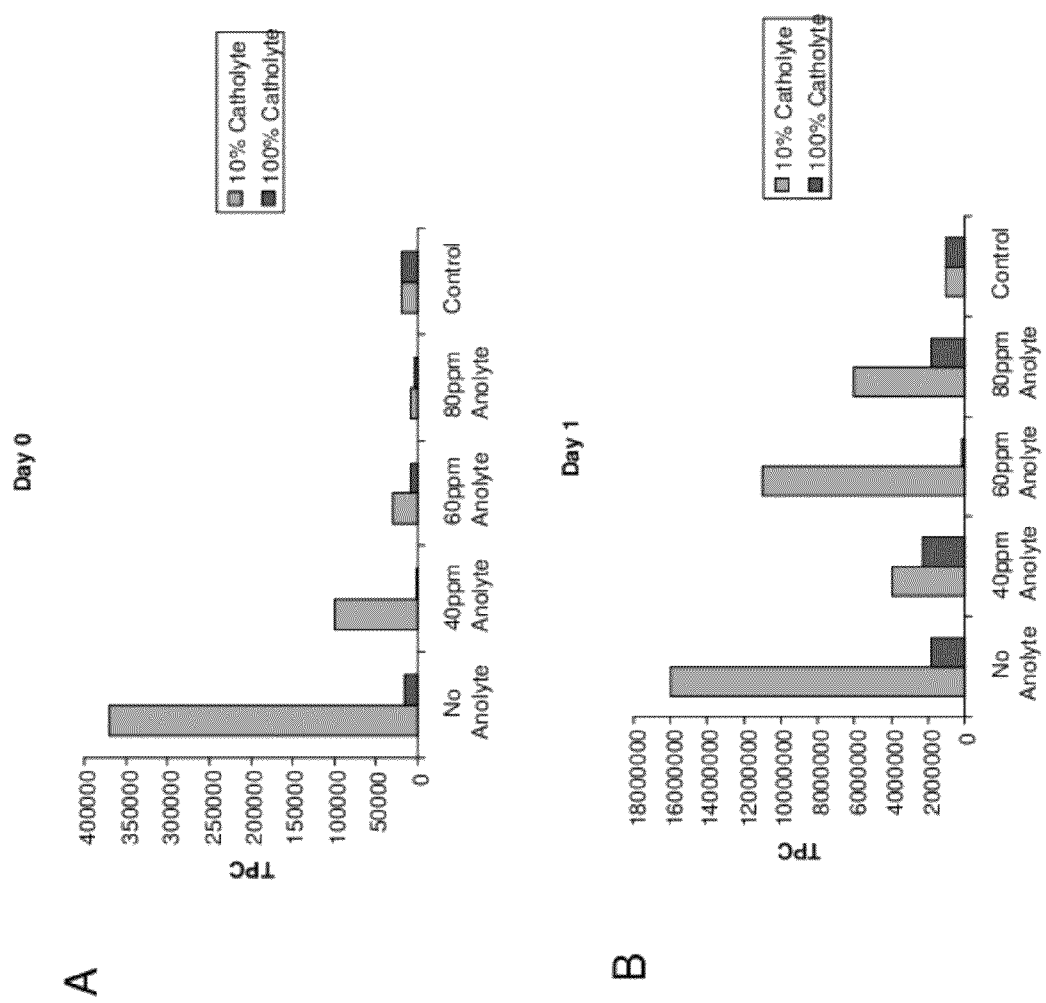
FIG. 2 is a bar graph depicting Total Aerobic Plate Counts (TPC) counts of produce treated with catholyte solution after treatment with different concentrations of anolyte solution.

As shown in Table 6 and FIG. 2A, it is clear that undiluted catholyte treatment with no anolyte treatment ($1.5 \times 10^4$) produced counts similar to those seen in plant controls ($2.0 \times 10^4$). With increasing amount of anolyte, there is a reduction by about one log unit when compared to plant controls (FIG. 2A). Though the undiluted catholyte treatment produced some reduction in log values when combined with anolyte at 80 ppm FAC, significant damage to the leaf structures occurred and thus, this treatment regime would be impractical due to the inherent visual damage caused by the undiluted catholyte treatment. When 10% catholyte dilution treatment was followed by increasing levels of anolyte, there was about a half log unit reduction in total plate counts, compared to plant controls (FIG. 2A). Interestingly the exposure time for anolyte to the catholyte treated leaves was only 20 seconds. Either additional treatment time or treatment with higher anolyte concentration may help attain additional log unit reduction in microbial load. The replacement of chlorine gas within the plant with the current regime of anolyte solution may provide a cost saving opportunity as it would eliminate issues with chlorine purchase and storage, provide ready chlorination capability from simple brine solutions, and eliminate HAZMAT and Homeland Security issues with using bottled chlorine. From a toxicological perspective, the tandem catholyte/anolyte treatment should eliminate the production of chlorinated hydrocarbons, especially chloroform. Although produced in very low levels, there are significant implications of even low level, constant exposure to these chemicals.

Table 7 and FIG. 2B, depicting the data 24 hours post packing, show that in all cases the catholyte/anolyte treated vegetable samples rebounded in total plate counts by at least 2-3 log units. Similarly, a 2-3 log unit increase was seen in the plant produced products. In both cases, there does not seem to be a significant longevity to the overall microbial kill. If there was a residual effect of chlorine, applied using either method, it would be expected to have beneficial impact upon overall shelf life. However, sensory characteristics would also be expected to be negatively impacted by lingering chlorine.

Regardless, one would expect that with a good knockdown in counts from either the chlorine gas or the tandem catholyte/anolyte system would not result in such a rebounding of total plate counts after 24 hours. One explanation for this rapid rebound may be the amount of free water remaining within the packages. Free, available water is the key to microbial growth, even at temperatures just above the freezing point. Numerous articles have described many bacteria that can grow and flourish even at low temperatures. In particular, Pseudomonas species have been well described as growing on many substrates at refrigerator temperatures as have many others. However, Pseudomonas has also been well described as a spoilage organism.

Example 3

Second Test of Treating with Catholyte and Anolyte Solutions to De-Soil and Disinfect Produce Introduction The tandem catholyte and anolyte treatment of fresh vegetable samples was repeated using a 10% catholyte dilution and anolyte at concentrations of either 90 ppm FAC or 120 ppm FAC. The method used for these trials was the same as that followed for Example 2 above.

Results and Discussion

Figure 3:
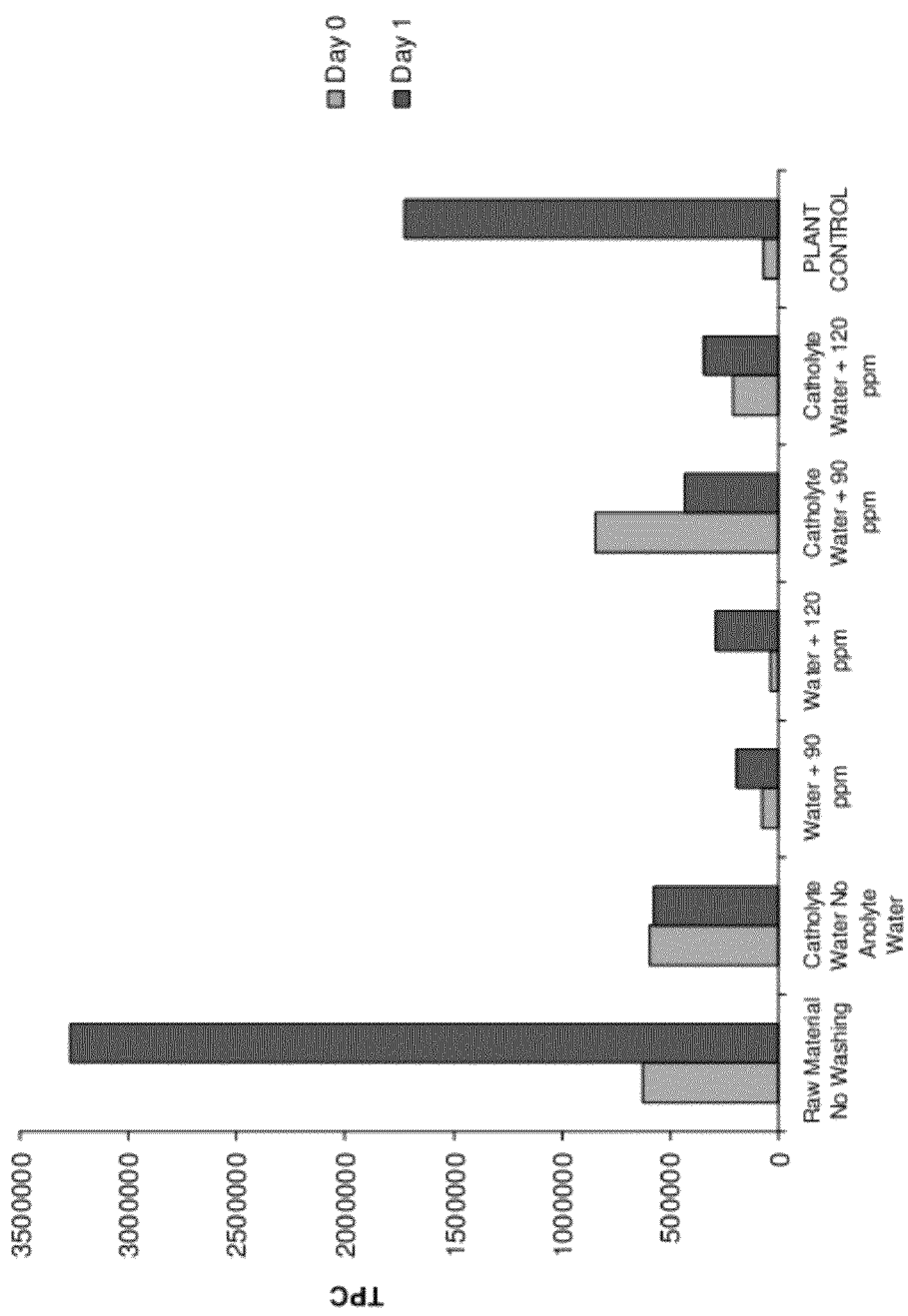
FIG. 3 is a bar graph depicting TPC counts of produce treated with catholyte solution after treatment with different concentrations of anolyte solution.

As shown in FIG. 3 use of anolyte solution at either 90 ppm or 120 ppm FAC reduced the microbial load by about one log unit when compared to the no wash control at day 0. However, using anolyte at either 90 ppm or 120 ppm FAC gives about a one log unit reduction in microbial load compared to the no wash control 24 hours post packaging. These results demonstrate that increasing the concentration of anolyte from 80 ppm to at least 90 ppm FAC provides a reduction in microbial load after 24 hours (comparing FIG. 2B to FIG. 3).

Example 4

De-Soiling Produce by Treating with Catholyte Solutions Produced by the Electrolysis of Bicarbonate Solutions Introduction The tandem catholyte and anolyte treatment of fresh vegetable samples was repeated using a bicarbonate solution for the electrolysis step. The methods used were similar as for Example 2 above, however the samples were immersed in catholyte for 40 seconds in these trials. Also, the catholyte solutions produced had a pH of 9.7, and the anolyte solutions had a pH of 8.5 and a concentration of 80 ppm FAC.

Results and Discussion

The results of catholyte and anolyte treatment on surface tension and turbidity are shown in Tables 8-10. Undiluted catholyte had a surface tension of 61.7 mN (Table 9). However, following ultrasonication, the surface tension of the undiluted catholyte increased slightly to 64.3 mN (Table 9). When the 10% catholyte dilution was used, the surface tension was 69.4 mN (Table 10). The surface tension also increased slightly to 70.8 mN after ultrasonication (Table 10). These results were consistent with those from previous trials (Table 5). In most cases, the surface tension of the solvent increased after catholyte washing and ultrasonication treatment. There was one exception, the undiluted catholyte (61.7 mN), which is believed to be caused by destruction of the protective coating of the leaves, as discussed above.

Turbidity measurements similarly increased after ultrasonication (Tables 9 and 10). Surprisingly, in this trial the 10% catholyte solution had a higher turbidity (21.1 NTU)

than the undiluted catholyte (11.7 NTU). It seems that the reason for the enhanced ability of the 10% catholyte dilution to de-soil was due to its ionic interaction, which nullified the surface to surface interactions of the soils with the surface of the vegetables resulting in an increased turbidity and enhanced release of soils and biofilms. While water has its share of ionic character and hydrogen bonding, it is usually with itself rather than soils and biofilms.

TABLE 8

| Electrolyte | Surface Tension (mN/m) | Turbidity (NTU) |
|---|---|---|
| Catholyte | 62.3 | 1.26 |
| Anolyte | 64.3 | 1.28 |

TABLE 9

Using undiluted catholyte

| Treatment | Surface Tension (mN/m) | Turbidity (NTU) |
|---|---|---|
| After wash with 100% catholyte | 61.7 | 11.7 |
| After wash and ultrasonication | 64.3 | 15.9 |
| After wash with anolyte | 65.1 | 1.58 |

TABLE 10

Using 10% catholyte dilution

| Treatment | Surface Tension (mN/m) | Turbidity (NTU) |
|---|---|---|
| After wash with 10% catholyte | 69.4 | 21.1 |
| After wash and ultrasonication | 70.8 | 32.1 |
| After wash with anolyte | 71.1 | 2.52 |

What is claimed is:

1. A method for de-soiling and disinfecting produce, the method comprising:
   treating the produce with a catholyte solution for at least 15 seconds to yield a catholyte treated produce,
      wherein treatment with the catholyte solution for at least 15 seconds yields at least a 19% increase in de-soiling of the produce as compared to treating the produce with a liquid detergent solution having the same surface tension as the catholyte solution, and
      wherein the catholyte solution has a pH that ranges from approximately 12.3 to approximately 13.0;
   sonicating the catholyte-treated produce for at least 20 seconds to yield a sonicated produce,
      wherein sonication for at least 20 seconds yields at least a 1.5-fold increase in de-soiling of the catholyte-treated produce as compared to treating the produce with the catholyte solution without sonication, and
      wherein sonication occurs at an ultrasonication frequency that ranges from approximately 20 kHz to approximately 60 kHz; and
   treating the sonicated produce with an anolyte solution for at least 20 seconds,
      wherein treatment with the anolyte solution for at least 20 seconds yields at least a 1 log unit reduction in microbial load as compared to the microbial load of produce not treated with the anolyte solution,
      wherein the anolyte solution has a concentration at least 80 ppm Free Available Chlorine (FAC), and
      wherein the anolyte solution has a pH that ranges from approximately 6.2 to approximately 7.4,
   wherein the catholyte and anolyte solutions were generated by an electrolytic cell that produces laminar flow.

2. The method of claim 1, further comprising electrolyzing an ionic solution to generate the catholyte solution and anolyte solution.

3. The method of claim 1, wherein the ionic solution is a brine solution or a bicarbonate solution.

4. The method of claim 1, wherein the electrolyzing occurs less than 12 hours prior to treating the produce with the catholyte solution and the anolyte solution.

5. The method of claim 1, wherein treatment with the catholyte solution comprises immersing the produce in a wash tank containing the catholyte solution.

6. The method of claim 5, further comprising spraying the produce with the catholyte solution prior to immersing the produce in the wash tank.

7. The method of claim 1, wherein the catholyte solution is a diluted catholyte solution that is used as a 10% dilution.

8. The method of claim 1, wherein the sonicating occurs in a wash tank containing the catholyte solution.

9. The method of claim 1, wherein the sonicating occurs at multiple frequencies.

10. The method of claim 1, wherein treatment with the anolyte solution comprises immersing the produce in a wash tank containing the anolyte solution or spraying the produce with the anolyte solution.

11. The method of claim 1, wherein the produce is selected from the group consisting of lettuce, a leafy vegetable, a ground plant, a tree fruit, a berry, a nut, and any combination thereof.

12. A method for de-soiling and disinfecting produce, the method comprising:
   immersing the produce in a wash tank containing a catholyte solution for at least 15 seconds to yield an immersed produce,
      wherein immersion in the catholyte solution for at least 15 seconds yields at least a 19% increase in de-soiling as compared to immersing the produce in a liquid detergent solution having the same surface tension as the catholyte solution, and
      wherein the catholyte solution has a pH that ranges from approximately 12.3 to approximately 13.0;
   sonicating the immersed produce for at least 20 seconds to yield a sonicated produce,
      wherein sonication for at least 20 seconds yields at least a 1.5-fold increase in de-soiling of the immersed produce as compared to treating the produce with the catholyte solution without sonication, and
      wherein the sonicating occurs at an ultrasonication frequency that ranges from approximately 20 kHz to approximately 60 kHz; and
   treating the sonicated produce with an anolyte solution for at least 20 seconds,
      wherein treatment with the anolyte solution for at least 20 seconds yields at least a 1 log unit reduction in microbial load as compared to the microbial load of produce not treated with the anolyte solution,
      wherein the anolyte solution comprises a concentration at least 80 ppm FAC, and
      wherein the anolyte solution has a pH that ranges from approximately 6.2 to approximately 7.4,
   wherein the catholyte and anolyte solutions were generated by an electrolytic cell that produces laminar flow.

* * * * *